Patented Nov. 24, 1953

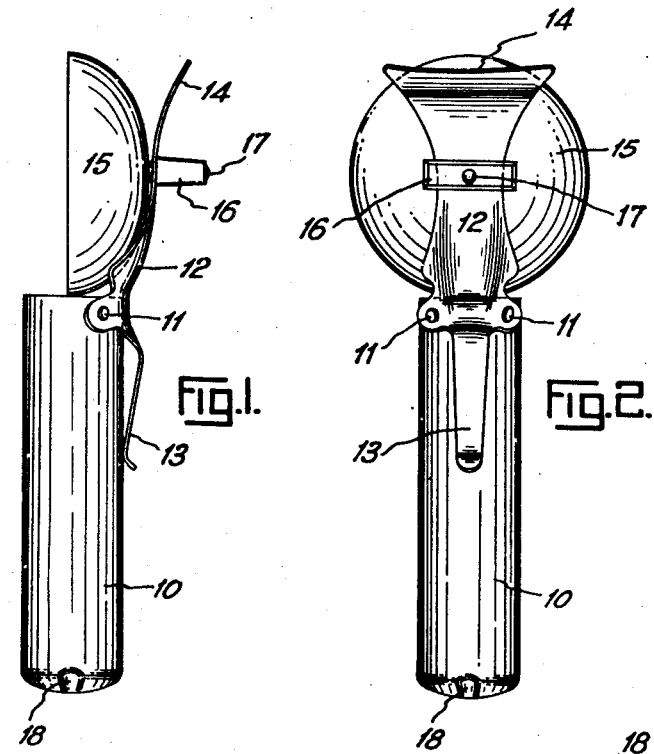
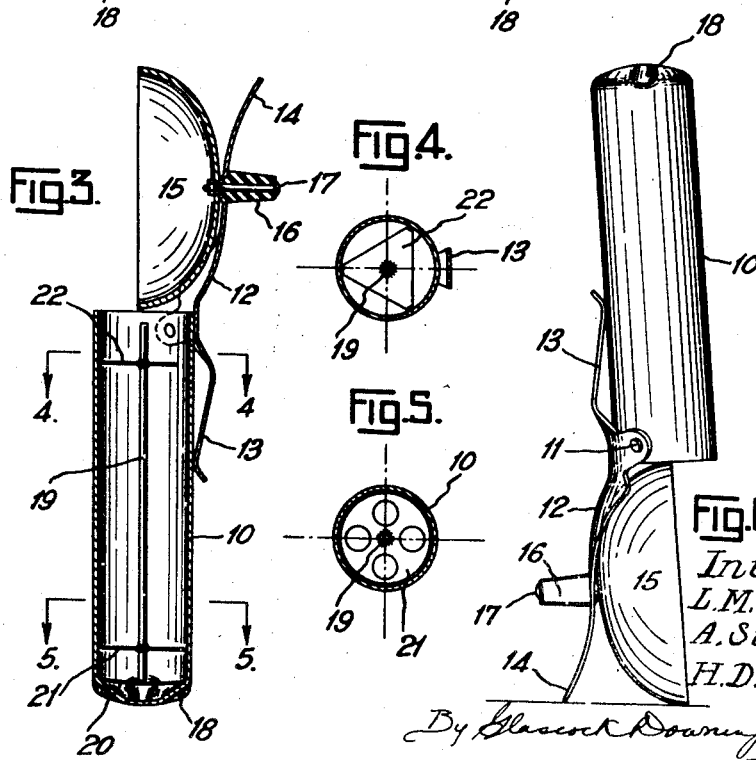

2,660,143

UNITED STATES PATENT OFFICE 2,660,143

THERMOSTATIC WARNING DEVICE

Lewis Michael Simmons and Adrienne Simmons, Rose Bay, near Sydney, New South Wales, and Henry Dixon Arnott, Sydney, New South Wales, Australia Application September 25, 1950, Serial No. 186,566

Claims priority, application Australia October 7, 1949

3 Claims. (Cl. 116—102)

This invention relates to an improved device adapted for use in conjunction with the heating of liquids and is intended to emit an audible signal when the temperature of the liquid approaches boiling point or some predetermined level above which further heating would be undesirable.

More particularly the invention has been devised for use in conjunction with domestic cooking vessels employed for the scalding of milk or for the heating of other liquids which expand rapidly or suffer other undesired change when their temperature approaches or reaches boiling-point, or other particular temperature.

Various means have been devised from time to time to provide an indication of the approximate or specific temperature of liquid being heated and several inventions have been devised to provide for automatically controlling the source of heat. Those providing for a visual indication call for frequent inspection with consequent inconvenience, while those providing for automatic control of the source of heat are relatively expensive and inconvenient to install.

The present invention succeeds in providing convenient and comparatively compact means which can be readily manufactured at relatively small cost, and which is so sensitive to variations in temperature that it can be relied on to give a timely audible signal when the liquid being heated has reached the predetermined or optimum temperature. Such timely notice allows of the heating means receiving attention before the liquid can be adversely affected by overheating or before boiling over with all the attendant undesired effects which can occur.

The invention relies for its operation on sudden movement produced by application of heat to a suitably arranged bimetallic element or other expansible component.

Briefly, the invention comprises a heat conducting receptacle designed to be immersed in the liquid to be heated and furnished with means whereby it can be supported conveniently on the rim of the vessel containing the liquid; a bimetallic element in said receptacle, designed to change its curvature suddenly at or about a predetermined temperature; a gong supported by the receptacle, and a striker supported in the receptacle and arranged to strike the gong when the aforesaid bimetallic element suddenly changes its curvature under the influence of heat.

In order however that the invention may be clearly understood and readily carried into practical effect reference is now made to the drawings accompanying and forming part of this complete specification.

Figure 1 is a side elevation of the improved device in its preferred form.

Figure 2 is a rear view of the device illustrated by Figure 1.

Figure 3 is a central vertical section of the device illustrated by Figure 1.

Figure 4 is a transverse section taken on the plane 4—4 of Figure 3.

Figure 5 is a transverse section taken on the plane 5—5 of Figure 3; and

Figure 6 shows the device standing in an inverted position when not in use.

The body of the improved device comprises a heat-conducting tubular receptacle 10 in the form of a sheath and this has secured to it as by rivets 11 a bracket 12. The lower portion of this bracket 12 constitutes a clip 13 whereby the device as a whole may be supported on the rim of a heating vessel; and the upper portion is flared to constitute a convenient finger-piece 14 which also serves as a leg as will be understood on reference to Figure 6.

The bracket 12 also serves to support a gong 15. In the particular construction illustrated the bracket 12 has a rectangular indentation to receive a complementary projection (see Figure 3 on a thumb-piece 16 of heat insulating material. This thumb-piece 16 may be secured in position by a relatively long rivet or by a bolt such as 17.

The bottom of the receptacle 10 has flutes such as 18 for the purpose hereinafter explained.

Inside the receptacle 10 a striker in the form of rod 19 rests on the upper face of a bimetallic element in the form of a dished-disc 20. The rod 19 may be supported loosely in a vertical position by any convenient means. In the construction illustrated the rod 19 has a disc 21 of light-weight material affixed to it near its lower extremity; and near its upper extremity it has fast on it a triangular distance-piece 22 which may be of the same material as disc 21. The disc 21 together with the distance-piece 22 ensures that the rod 19 will remain concentric within the receptacle 10, while leaving it free to move axially therein.

It will be observed that the upper extremity of the rod 19 terminates approximately one-eighth of an inch below the gong 15.

Viewed from above, the disc 20 is normally concave, and because of the flutes 18 it lies a little above the bottom of the receptacle 10.

The manner in which the improved device is employed in practice is as follows:

The receptacle 10 is inserted in the vessel, wherein liquid is to be heated, with the clip 13 overhanging the rim of the vessel and gripping the wall of the latter between itself and the receptacle 10.

As the liquid heats up, heat is conducted through the receptacle 10 to the disc 20 and the expansible component of this element places the latter more and more under tension until finally at or about the predetermined temperature, this disc suddenly flicks from a concave to a convex curvature (as viewed from above) and in doing so exerts sufficient strength to throw the rod 19 against the gong 15 above. When the striking of the gong has been heard the vessel should be removed from the source of heat, or the source cut off.

To remove the improved device from the vessel the thumb can be placed under the thumb-piece 16 and the first and second fingers of the same hand hooked over the finger-piece 14: the whole can then be lifted and it should be stood in an inverted position as shown by Figure 6. In this position the receptacle 10 is at a slight angle to the vertical: this assists any liquid which has gained access to the receptacle 10, by condensation or otherwise, to drain out, and at the same time the disc 20 cools down and resumes its initial curvature. The device is then ready for further use.

It will be appreciated that were it not for the flutes 18 or some such means, any moisture within the receptacle 10 might cause the disc 20 to adhere to the bottom thereof and thus interfere with proper functioning of the device.

While only one form of the invention has been illustrated it will be appreciated that the improved device could be made up in many other forms without departing from the scope of this invention.

What we claim is:

1. A thermostatic warning device for use with culinary vessels comprising, in combination, a heat conducting cylindrical receptacle for immersion in liquid to be heated and furnished with means whereby it can be supported conveniently on the rim of the vessel, a curved bimetallic element in the lower portion of said receptacle which changes its curvature suddenly when subjected to a predetermined degree of heat derived from said liquid, a gong supported by the receptacle, and a striker in the form of a rod supported, by said bimetallic element, longitudinally in said receptacle so as to strike the gong when the aforesaid bimetallic element changes its curvature suddenly at or about the aforesaid predetermined degree.

2. A thermostatic warning device for use with culinary vessels comprising, in combination, a tubular heat conducting receptacle for immersion in liquid to be heated and furnished with means whereby it can be supported conveniently on the rim of the vessel, a bimetallic element in the form of a dished-disc within the lower portion of said receptacle which changes it curvature suddenly when subjected to a predetermined degree of heat derived from said liquid, a gong supported by the receptacle, and a striker in the form of a rod which normally sits on said bimetallic element and is arranged to strike said gong when said bimetallic element changes its curvature suddenly at or about the aforesaid predetermined degree.

3. A thermostatic warning device for use with culinary vessels as claimed in claim 1, in which a bracket is affixed to the heat conducting receptacle for supporting said gong and provides means whereby the device as a whole is clipped onto the rim of the vessel, and also provides means which assist to support the device when inverted.

LEWIS MICHAEL SIMMONS.
ADRIENNE SIMMONS.
HENRY DIXON ARNOTT.

References Cited in the file of this patent

UNITED STATES PATENTS

| Number | Name | Date |
|---|---|---|
| 992,145 | Banhart | May 16, 1911 |
| 1,727,400 | Folberth | Sept. 10, 1929 |
| 1,893,198 | Carson | Jan. 3, 1933 |
| 2,378,135 | Evans | June 12, 1945 |
| 2,443,559 | Garceau | June 15, 1948 |

FOREIGN PATENTS

| Number | Country | Date |
|---|---|---|
| 238,827 | Switzerland | Nov. 16, 1945 |